United States Patent [19]
Peabody et al.

[11] Patent Number: 5,524,918
[45] Date of Patent: Jun. 11, 1996

[54] FOOT-REST DEVICE FOR A MOTORCYCLE OR LIKE DEVICE

[76] Inventors: Steven Peabody, 320 W. Ash St., Zionsville, Ind. 46077; Gregory Delaney, 7320 N. State Rd. 267, Brownsburg, Ind. 46112

[21] Appl. No.: 444,262

[22] Filed: May 18, 1995

[51] Int. Cl.$^6$ ..................................................... B62J 25/00
[52] U.S. Cl. ................................................ 280/291; 296/75
[58] Field of Search ................................ 280/291; 296/75; 180/219

[56] References Cited

FOREIGN PATENT DOCUMENTS

| 77278 | 9/1949 | Czechoslovakia | 280/291 |
| 18823 | of 1903 | United Kingdom | 280/291 |

*Primary Examiner*—Margaret A. Focarino
*Assistant Examiner*—F. Zeender
*Attorney, Agent, or Firm*—Robert A. Spray

[57] ABSTRACT

A foot-rest device for a motorcycle, the foot-rest having a telescopable assembly of at least two and preferably three cylindrical support bodies, whose telescoping nature provides that they may be easily adjusted to either an extended foot-rest position or to a retracted position. Screw-type and spring components releasably hold each of those conditions, providing a safe foot-rest position for the cycle's passenger, but also a retracted position not attainable by swivel-type connectors.

5 Claims, 4 Drawing Sheets

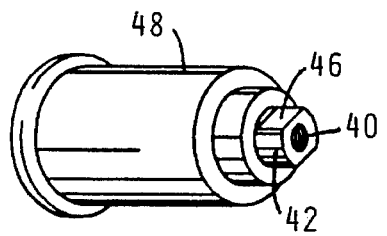
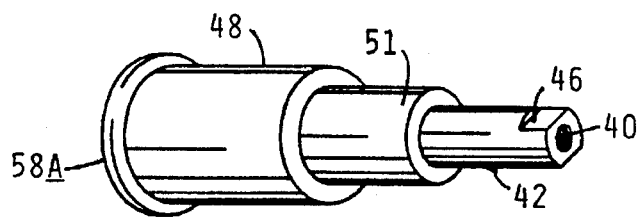
Fig. 4  Fig. 5
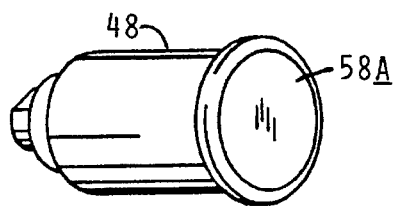
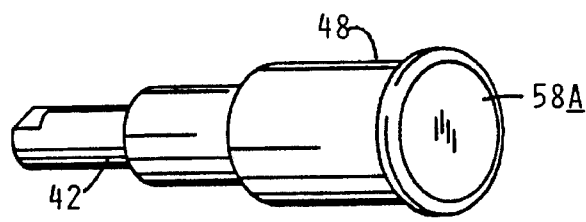
Fig. 6  Fig. 7
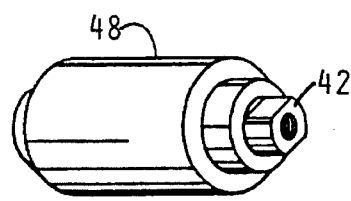
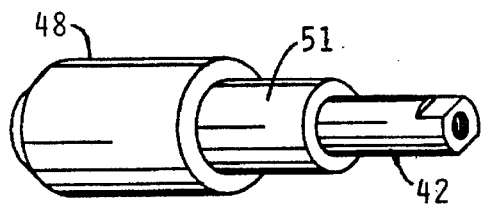
Fig. 8  Fig. 9
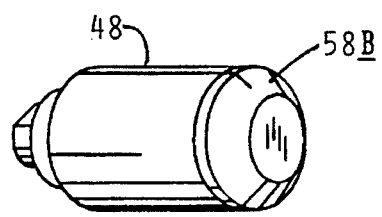
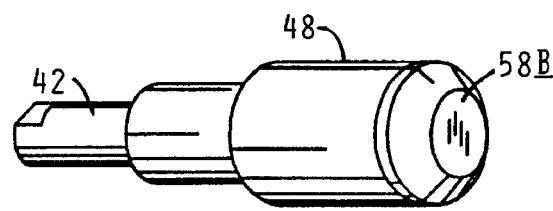
Fig. 10  Fig. 11

FOOT-REST DEVICE FOR A MOTORCYCLE OR LIKE DEVICE

FIELD AND BACKGROUND OF THE INVENTION

The present invention relates to motorcycles or like devices. More particularly it relates to an auxiliary therefor, and still more particularly the invention relates to novel foot-rest devices for the passenger of a motorcycle or like device.

As to such a device, the invention relates to and achieves a novel foot-rest having a duality of optional conditions, i.e., an operative or extended position providing a foot-rest for the passenger, and a retracted or collapsed position for avoiding a dangerously protruding component when the motorcycle is being used without a passenger behind the driver.

Inherent problems with respect to a foot-rest for a motorcycle or like device:

Motorcycles are often used to carry a passenger in addition to the motorcycle driver; and intentionally motorcycles are thus provided with a passenger seat rearward of the driver's seat.

In this rearward position of the passenger's seat, the passenger's feet are naturally hanging in a position adjacent the hot exhaust tubing component or other motorcycle components; and to protect against rubbing or even touching such components, and for the supporting comfort of the passenger, a foot-rest (often called a "peg") is supported by the motorcycle in a rearward position with those accommodations and factors in mind.

Due to the presence of exhaust tubing and/or other components of the motorcycle, foot-rests have been made retractable by being of foldup nature, but the type of retractable foot-rest or foot-peg conventionally used does not permit it to have a foldover position closely enough adjacent the motorcycle to avoid some bother or safety hazard, for, as particular requirements the foot-rest or foot-peg is desirably long enough to carry and position the passenger's foot safely far enough away from the exhaust tubing or other components of the motorcycle; and yet, conversely, the foot-rest or foot-peg is desirably short enough that in a retracted condition (when no passenger is present) the retracted foot-rest will not be an undesirable projection.

A foot-rest of advantageous nature is desired for nearly 100% of all motorcycles, whether or not purchased originally with the thought of being a passenger-carrying vehicle; for regardless of original intent of a purchaser, surely at sometime in the motorcycle's life it will be used in a passenger-carrying situation, or at least needful of a foot-rest as an auxiliary for re-sale purpose of the cycle.

Another factor of consideration is the fact that an improved foot-rest device is desirably affixable to existing motorcycles which conventionally are already provided with mounting sockets for peg-type foot-rests; and, for ease of installation and for avoidance of installation damage to the cycle, a replacement foot-rest (such as would be a significant market expected for an improved foot-rest) would be affixable to the cycle without the need of drilling a new mounting socket feature into the cycle components.

BRIEF SUMMARY OF THE INVENTIVE CONCEPTS

According to the invention, there is provided a foot-rest device for a motorcycle of a typical type, having a rearward seat which supports the passenger behind the driver, and in a location on the motorcycle or such that the feet of the passenger are positioned adjacent exhaust tubing or other features of the motorcycle.

The exhaust or other features of the motorcycle are often found to be so located that a swivel type retractable foot-rest is not practical, due to the interference of such features which blocks a swivelling motion of the foot-rest to a retracted position in which there is no objectional foot-rest protrusion from the motorcycle when no passenger is being carried.

Accordingly, the invention here provides a "telescopable" assembly of at least two and preferably three cylindrical support bodies; and their telescoping nature provides that they may be adjusted, by easy manual effort from an extended foot-rest position to a retracted position.

Holding means are provided which releasably maintain each of those conditions.

Further details are set forth in the more detailed description contained herein.

Prior Art capability and motivations, as helping to show patenability here:

Even in hindsight consideration of the present invention to determine its inventive and novel nature, it is not only conceded but emphasized that the prior art had many details usable in this invention, details of both capability and motivation, but only if the prior art had had the guidance of the present concepts of the present invention.

That is, it is emphasized that the prior art had/or knew several particulars which individually and accumulatively show the non-obviousness of this combination invention. E.g.:

a. The prior art has had motorcycles for scores of years, of many shapes, natures, and sizes;

b. Motorcycles have always needed footrests, and the prior art has provided various types of footrests for scores of years;

c. The prior art, with the need being so apparent, has long provided motorcycles with foot-rests having a dual nature, i.e., extendable and retractable;

d. The ease of tooling for the present invention has surely given manufacturers ample incentive to have made modifications for commercial competitiveness in a competitive industry, if the concepts had been obvious;

e. The features of the present invention are reasonably likely considered by manufacturers and users to be of such an obvious advantage to motorcycle owners and their friend that manufacturers and/or users would likely consider foot-rests of this invention to have massive sales opportunities to a great multitude of persons; and manufacturers and/or users would have been likely to have developed this foot-rest if its concepts had been obvious;

f. The disadvantages of inferior or old style foot-rests have been of such a likely actual and universal nuisance, personally to a large number of users, that surely one would have created this invention if the concepts had been obvious;

g. The prior art has always had sufficient skill to make many types of motorcycle foot-rests, more than ample skill to have achieved the present invention, but only if the concepts and their combination had been conceived;

h. Substantially all of the operational characteristics and advantages of details of the present invention, when considered separately from one another and when considered separately from the present invention's details and non-technical accomplishment of the details, are within the skill of persons of various arts, but only when considered away from the integrated and novel combination of concepts which by their cooperative combination achieves this advantageous invention;

The details of the present invention, when considered solely from the standpoint of construction are exceedingly simple; and the matter of simplicity of construction has long been recognized as indicative of inventive creativity; and Similarly, and a long-recognized indication of inventiveness of a novel combination, is the realistic principle that a person of ordinary skill in the art, as illustrated with respect to the claimed combination as differing in the stated respects from the prior art both as to construction and concept, is presumed to be one who thinks along the line of conventional wisdom in the art and is not one who undertakes to innovate, Accordingly, although the prior art has had capability and motivation, amply sufficient to presumably give incentive to the development of a novel and practical foot-rest according to the present invention, the fact remains that this invention awaited the creativity and inventive discovery of the present inventors. In spite of ample motivation and capability shown by the many illustrations herein, the prior art did not suggest this invention.

Prior Art as Particular Instances of Failure to Provide this Foot-rest

In view of the industry motives and capabilities, it may be difficult to realize that the prior art has not projected itself to the combination purpose and achievement of the present invention even though the need and use of cycle foot-rests is a widespread daily and quite universal factor, and the cycle industry is quite commercial and competitive. Further, motorcycle users surely include an uncountable multitude of inventors and other persons, at least of sufficient experience, skill, etc., that the present invention would have been desired and attempted, and perhaps achieved, long ago, but only if its factors and combination-nature had been obvious.

The consideration of a nature of the present inventive concepts will be helped by a summarized consideration of the prior art; however, as cycle foot-rests are so well known and universally known and used that merely some reminders as to them as well-known prior art seem sufficient.

That is, motorcycle foot-rests have been known and used, and made to be retractable, for many scores of years.

As to retraction as a function or capability, nothing is here asserted to be novel; and, in contrast, the concepts of the present invention provide the building upon the principal nature and function of earlier motorcycle foot-rests, rather than any modification of the retraction/extension function itself/themselves.

Although various retractable foot-rests are of course here conceded, the general nature of prior art seems to be merely of foldup or removable nature, as far as the present inventors are aware.

SUMMARY OF THE PRIOR ART'S LACK OF SUGGESTIONS OF THE CONCEPTS OF THE INVENTION'S COMBINATION

In spite of all such factors of the prior art, the problem here solved awaited these inventors' consideration, ideas, and creativity. More particularly as to the novelty here of the invention as considered as a whole, the resume of the prior art uses and needs helps show its contrast to the present concepts, and emphasizes the advantages, novelty, and the inventive significance of the present concepts as are here shown, particularly as to utility and convenience of use as detailed herein, as to apparatus and a procedure.

Moreover, prior art articles known to these inventors, which could possibly be adapted for this duty, fail to show or suggest the details of the present concepts as a combination; and a realistic consideration of the prior art's differences from the present concepts of the overall combination may more aptly be described as teaching away from the present invention's concepts, in contrast to suggesting them, even as to a hindsight attempt to perceive suggestions from a backward look into the prior art, especially since the prior art has long had much motivation as to details of the present invention and to its provisions.

And the existence of such prior art knowledge and related articles embodying such various features is not only conceded, it is emphasized; for as to the novelty here of the combination, of the invention as considered as a whole, a contrast to the prior are helps also remind both the great variety of the various prior art articles and needed attempts of improvement, and the advantages and the inventive significance of the present concepts. Thus, as shown herein as a contrast to all the prior art, the inventive significance of the present concepts as a combination is emphasized, and the nature of the concepts and their results can perhaps be easier seen as an invention.

Although varieties of prior art are conceded, and ample motivation is shown, and full capability in the prior art is conceded, no prior art shows or suggests details of the overall combination of the present invention, as is the proper and accepted way of considering the inventiveness nature of the concepts.

That is, although the prior art may show an approach to the overall invention, it is determinatively significant that none of the prior art shows the novel and advantageous concepts in combination, which provides the merits of this invention, even though certain details are shown separately from this accomplishment as a combination.

And the prior art's lack of an invention of an economical foot-rest feature achieving the convenience, ease of installation, ease of use, simplicity of use, and other advantages of the present invention, which are goals only approached by the prior art, must be recognized as being a long-felt need.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

BRIEF DESCRIPTION OF THE DRAWINGS

The above description of the novel and advantageous invention is of somewhat introductory and generalized form.

5

Figure 1:
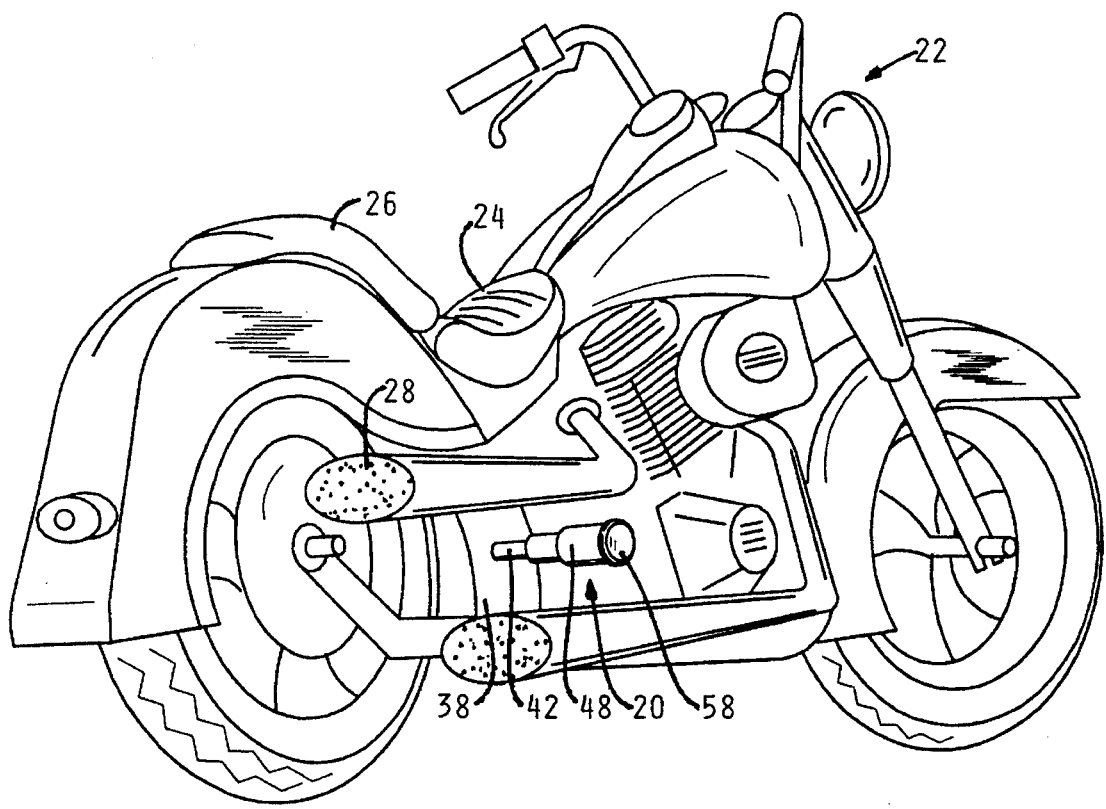
Figure 2:
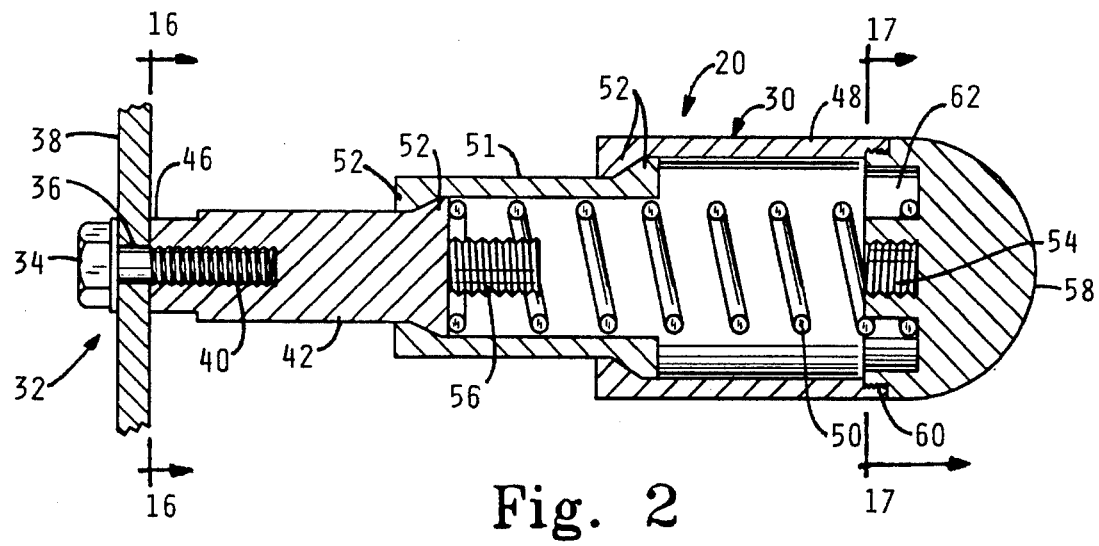
Figure 3:
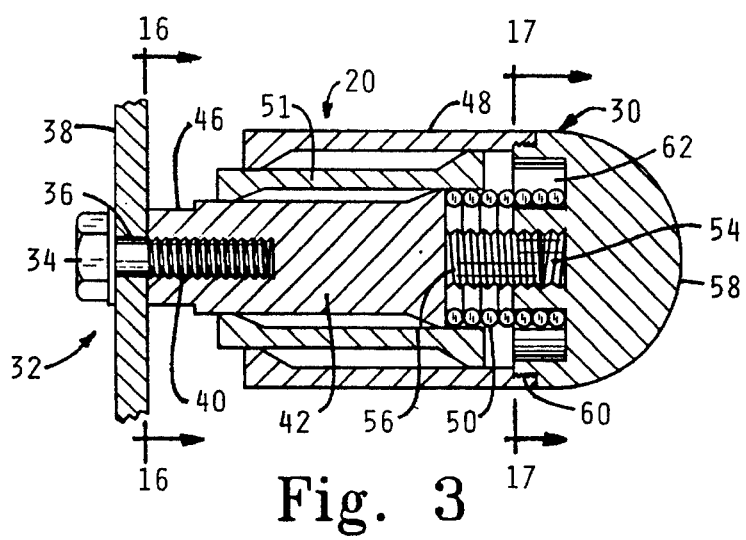
Figure 12:
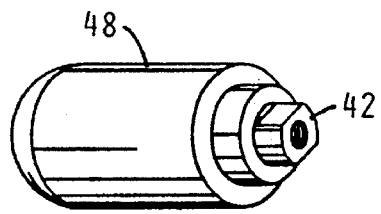
Figure 13:
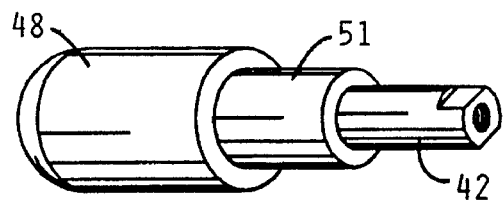
Figure 14:
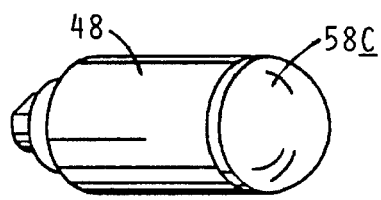
Figure 15:
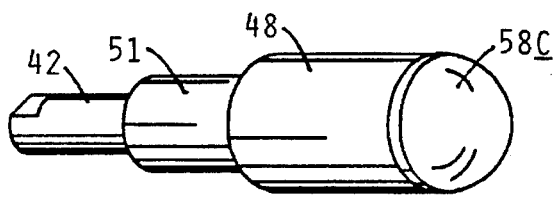
Figure 16:
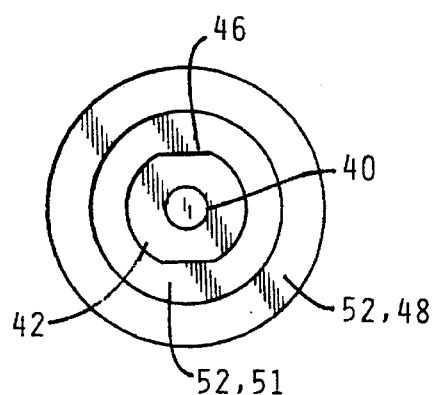
Figure 17:
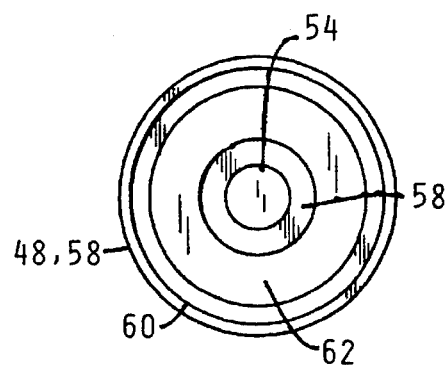

More particular details, concepts, and features are set forth in the following and more detailed description of illustrative embodiments, taken in conjunction with the accompanying Drawings, which are of somewhat schematic and diagrammatic nature for showing the inventive concepts; and in the Drawings:

FIG. 1 is a pictorial view of a motorcycle onto which a foot-rest according to the inventive concepts has been attached;

FIG. 2 is an axial cross sectional view of the foot-rest shown in FIG. 1, it being shown in FIG. 2 in its extended position;

FIG. 3 is an axial cross-sectional view like FIG. 2, except that the foot-rest in FIG. 3 is shown in its collapsed or retracted condition;

FIGS. 4–15 are pictorial views of foot-rests generally according to the foot-rest shown in FIGS. 1–3, the figures of Drawings in a first set (FIGS. 4–7) illustrating the foot-rest in a 1st Embodiment, FIGS. 4 and 6 showing the foot-rest in collapsed or retracted condition, as viewed in FIG. 4 from the end of the foot-rest which is to be attached to the motorcycle, and in FIG. 6 as viewed from the outer end of the foot-rest, FIGS. 5 and 7 being pictorial views similar to the views of FIGS. 4 and 6, respectively, except that FIGS. 5 and 7 show the foot-rest in an extended position;

In a 2nd set, FIGS. 8–11 illustrate the foot-rest in a 2nd Embodiment, FIGS. 8 and 10 showing the foot-rest in collapsed or retracted condition, as viewed in FIG. 8 from the end of the foot-rest which is to be attached to the motorcycle, and in FIG. 10 as viewed from the outer end of the foot-rest, FIGS. 9 and 11 being pictorial views similar to the views of FIGS. 8 and 10, respectively, except that FIGS. 9 and 11 show the foot-rest in an extended position;

In a 3rd set, FIGS. 12–15 illustrate the foot-rest in a 3rd Embodiment, FIGS. 12 and 14 showing the foot-rest in collapsed or retracted condition, as viewed in FIG. 12 from the end of the foot-rest which is to be attached to the motorcycle, and in FIG. 14 as viewed from the outer end of the foot-rest, FIGS. 13 and 15 being pictorial views similar to the views of FIGS. 12 and 14, respectively, except that FIGS. 13 and 15 show the footrest in an extended position;

FIG. 16 is an end view of the foot-rest, taken as per View-line 16—16 of FIGS. 2 and 3; and FIG. 17 is an end view of the outer cap body of the foot-rest, taken generally as shown by View-line 17—17 of FIGS. 2 and 3.

DETAILED DESCRIPTION OF ILLUSTRATIVE EMBODIMENTS

As shown in the Drawings, the present inventive concepts provide a foot-rest device 20 for a motorcycle 22 or like device, particularly in a motorcycle of a type in which two riders may sit one behind the other, one rider being the driver and one rider being the passenger.

The motorcycle or like device 22 is a typical type, provided with a forward seat 24 for the support of the driver and having a rearward seat 26 which supports the passenger behind the driver, in a location fore-and-aft of the motorcycle 22 or like device such that the feet of the passenger while seated on the passenger seat 26 are positioned adjacent exhaust tubing 28 or other features of the motorcycle or like device 22.

The motorcycle 22 is shown as having separate seats 24 and 26 to emphasize the relative position of the passenger and the driver, the passenger's seat 26 being behind and somewhat above that of the driver, although motorcycles as presently built often have the two seats 24 and 26 of an integral nature. That distinction, however, is of no particular concern to the present invention or its use, except that it is significant that the seat 26 for the passenger carries the passenger in a location such that the passenger's feet are adjacent exhaust tubing 28 or other features of the motorcycle.

According to the concepts of the present invention, the foot-rest device 20 comprises a telescoping support assembly 30, the telescoping nature of which provides that it has a variable length (comparing FIGS. 2 and 3) of and between an extended condition of FIG. 2 and a collapsed condition of FIG. 3. (It has already been noted that FIGS. 4,6,8,10,12 and 14 show the collapsed condition, and FIGS. 5,7,9,11,13, and 15 show the extended condition.)

The features of the assembly 30 (device 20) are perhaps easiest to be understood now by observing the illustrations of the concepts as are provided in FIGS. 2 and 3.

As shown adjacent the left end of FIGS. 2 and 3 of the Drawings, connection means 32 are shown for connecting the assembly 30 to a supporting portion of the motorcycle 22, the connection being such that the axis of the assembly 30 is generally perpendicular to the fore-and-aft axis of the motorcycle 22.

More particularly as shown, the connection means 32 is shown as a bolt 34 which extends outwardly through a hole 36 in a portion of the motorcycle frame 38, the bolt 34 screws-threadedly extending into an axial (female) hole 40 in the most inner (motorcycle-adjacent) portion of the assembly 30.

Variability of length is the dominant concept and achievement of the present invention, the assembly 30's variability in length being such as to provide an extended condition or a collapsed or retracted condition.

More particularly, in its extended condition (FIG. 2), assembly 30 projects substantially away from the motorcycle 22 safely away from the exhaust tubing 28 or other features, for ease of accommodation placement of the passenger's foot by placement of the passenger's foot along the foot-rest assembly 30 of the motorcycle 22.

In contrast, the inventive concepts provide that the assembly 30 has a collapsed or retracted condition (FIG. 3) in which the assembly 30 wholly lies closely adjacent the motorcycle 22.

Another particularly significant feature of the present invention, as may be noted in comparing FIGS. 2 and 3, is that the movement of telescoping portions of the assembly 30 is axially of the assembly 30.

Another significant feature of the present invention is that the assembly 30 comprises releasable holding means which optionally hold the assembly 30 in its extended condition or its collapsed condition.

In the form shown, the connection 32's bolt 34 connects to hole 40 which is in the most inner section of the assembly, that being a support body 42 shown of a general cylindrical shape (except for wrench-gripping flats 46 on its inner end), supportingly a part of the assembly 30, the support body 42 and the support means 32/34 being fixedly connectable, thus fixedly connecting the inner support body 42 of the assembly 30 to the motorcycle frame 38.

Considering the most inner support body 42 as being a first support component, and the most outer support component of the assembly 30 being a second support component 48, they being relatively rotatable and axially relatively movable, as the user pushes (here leftwardly) on the second support component 48 (FIG. 2), against the bias of a spring 50, the first and second support components $^{42}/_{48}$ are forced to the collapsed position of FIG. 3.

In FIG. 3, the support components $^{42}/_{48}$ have not only been pushed together, but the outer (second) support component 48 has been rotated, fixedly holding the two support components 42/48 in a screwthreaded holding condition, that being in a form shown by FIG. 3.

As shown, the extended length of the assembly 30 (FIG. 2) is made satisfactorily long, without the collapsed condition (FIG. 2) being unduly long, by providing between support bodies 42 and 48 one or more intermediate support cylinders, here shown as the intermediate cylinder 51, which may be but not necessarily is relatively rotatable with respect to either the first (inner) support body 42 or the second (outer) support body 48.

It will be noted that the holding means which hold the assembly 30 in an extended condition comprise inter-engaging abutments 52, they being in the form of circular rings or lips, which against the compressive bias of the spring 50 limit the outward travel of the second (outer) support body 48. Thus, the abutments are seen to be carried by two support bodies ($^{42}/_{48}$) of the assembly 30, with the spring means 50 biasing the two support bodies into engagement of their abutment means 52. The intermediate cylinder 51 also carries abutments 52.

In contrast, the holding means which hold the assembly 30 in a collapsed condition (FIG. 3) include relatively rotatable means, one of which is a female threaded hole 54 carried by the second (relatively outer) support body 48 of the assembly 30, and another of which is shown as a threaded shaft 56 carried by the first (relatively inner) support body 42 of the assembly 30.

Also, in all of the embodiments, it is noted that the outer (second) support body is provided with an end cap 58 which is screw-threadedly secured by screw threads 60 to the outer end of the second support body 48; and it is this cap body 58 which has the female threaded hole 54 and which has an annular recess 62 which receives the outer end of the spring 50.

However, due to the tight screw thread connection 60, the end cap 58 may for all practical purposes be considered as a part of the second support body 48.

While noticing the end cap 58 in FIGS. 2 and 3, it is to be noted that the end cap 58 takes different forms in each of the 1st, 2nd, and 3rd Embodiments; and thus in the 1st Embodiment (FIGS. 4-7) the end cap is noted by the reference 58A, being a flat cap with a rounded periphery, whereas the end cap in the 2nd Embodiment (FIGS. 8-11) has a dome-like shape with a flattened end, and is designated as 58B, and the end cap 58C of the 3rd Embodiment (FIGS. 12-15) is of a dome-like shape. Those configurations of end cap are illustrative, and their design is deemed optional.

SUMMARY OF OPERATIONAL DETAILS, AND THEIR ADVANTAGES

The present invention as detailed herein has advantages in both concept and in component parts and features; for in contrast to other articles known to the inventors as to the prior art mentioned, the invention provides advantageous features which should be considered, both as to their individual benefit, and to whatever may be considered to be also their synergistic benefit toward the invention as a whole.

Such features include:
(a) Easy to use and to change condition, i.e., setting;
(b) Certain as to holding in either extended or retracted position;
(c) Use is easy to learn;
(d) Economical of formation and of installation task;
(e) Provides convenience of other foot-rests without inherent disadvantages of others:
(f) Mounting easy on most existing cycles;
(g) The various features provide installation particularly beneficial to that of a fullsize motorcycle, although the concepts are not limited to that type of use;
(h) various features and advantages act synergisticly;
(i) Standardized size fits most cycles;
(j) Virtually eliminates bother once installed; and
(k) Long lasting, with minimal maintenance.

Conclusion as to inventive combination:

It is thus seen that a motorcycle foot-rest assembly constructed and used according to the combination of inventive concepts and details herein set forth, provides novel concepts of a desirable and usefully advantageous article and procedure, yielding advantages which are and provide special and particular advantages when used as herein set forth.

In summary as to the nature of the overall assembly's advantageous concepts, their novelty and inventive nature is shown by novel features of concept and construction shown here in advantageous combination and by the novel concepts hereof not only being different from all the prior art Known, even though other cycle foot-rests have been known and used for scores of years, but because the achievement is not what is or has been suggested to those of ordinary skill in the art, especially realistically considering this as a novel combination comprising components which individually are similar in nature to what is well known to most all persons, surely including most of the many makers and users and sellers of cycles for a great number of years, throughout the entire world. No prior ark component or element has even suggested the modifications of any other prior art to achieve the particulars of the novel concepts of the overall combination here achieved, with the special advantages which the overall combination article provides; and this lack of suggestion by any prior art has been in spite of the long worldwide use of various types of cycle foot-rests.

The differences of concept and construction as specified herein yield advantages over the prior art; and the lack of this invention by the prior art, as a prior art combination, has been in spite of this invention's apparent simplicity of the construction once the concepts have been conceived, in spite of the advantages it would have given, and in spite of the availability of all the materials, to all persons of the entire world, and the invention's non-technical and openly-visible nature.

Quite certainly this particular combination of prior art details as here presented in this overall combination has not been suggested by the prior art, this achievement in its particular details and utility being a substantial and advantageous departure from prior art, even though the prior art has had similar components for numbers of years. And particularly is the overall difference from the prior art significant when the non-obviousness is viewed by a consideration of the subject matter of this overall device as a whole, as a combination integrally incorporating features different in their combination from the prior art, in contrast to merely separate details themselves, and further in view of the prior art not achieving particular advantages here achieved by this combination.

Accordingly, it will thus be seen from the foregoing description of the invention according to this illustrative embodiment, considered with the accompanying drawings, that the present invention provides new and useful concepts of a novel and advantageous article and procedure, possessing and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

The invention claimed is:

1. A foot-rest device for a motorcycle in which two riders may sit one behind the other, one rider being the driver and one rider being the passenger, the motorcycle being provided with a forward seat for the support of the driver and having a rearward seat which supports the passenger behind the driver and in a location fore-and-aft of the motorcycle such that the feet of the passenger while seated on the passenger seat are positioned adjacent exhaust tubing or other features of the motorcycle, the foot-rest device comprising a telescoping support assembly of parts along an axis, the telescoping nature thereof providing that it has a variable overall length between an extended condition and a collapsed condition, and means for connecting the assembly to a portion of the motorcycle in which the axis of the assembly is generally perpendicular to the fore-and-aft axis of the motorcycle, the assembly's variability in length being:

(a) such that in its extended condition it projects substantially away from the motorcycle, away from the said exhaust tubing or other features, for ease of accommodation placement of the passenger's foot by placement of the passenger's foot along the foot-rest device of the motorcycle, (b) and such that in its collapsed condition it wholly lies closely adjacent the motorcycle, in which the assembly also comprises releasable holding means which optionally hold the assembly in its extended condition and its collapsed condition, in which the connecting means comprises a support body supportingly connected as a part of the assembly, and a support means for supporting connection to the motorcycle, the support body, and the support means being fixedly connectable, in which the holding means comprises a first support component fixedly connected to the support body and a second support component fixedly connected to the assembly, in a combination in which the first-support component and the second support component are relatively rotatable, and by relatively rotatable motion they are engageable and disengageable to the collapsed and extended condition respectively.

2. A foot-rest in which two riders may sit one behind the other, one rider being the driver and one rider being the passenger, the motorcycle being provided with a forward seat for the support of the driver and having a rearward seat which supports the passenger behind the driver and in a location fore-and-aft of the motorcycle such that the feet of the passenger while seated on the passenger seat are positioned adjacent exhaust tubing or other features of the motorcycle, the foot-rest device comprising a telescoping support assembly of parts along an axis, the telescoping nature thereof providing that it has a variable overall length between an extended condition and a collapsed condition, and means for connecting the assembly to a portion of the motorcycle in which the axis of the assembly is generally perpendicular to the fore-and-aft axis of the motorcycle, the assembly's variability in length being:

(a) such that in its extended condition it projects substantially away from the motorcycle, away from the said exhaust tubing or other features, for ease of accommodation placement of the passenger's foot by placement of the passenger's foot along the foot-rest device of the motorcycle, (b) and such that in its collapsed condition it wholly lies closely adjacent the motorcycle, in which the movement of telescoping parts of the assembly is axial of the assembly, in which the assembly also comprises releasable holding means which optionally hold the assembly in its extended condition and its collapsed condition, in which the connecting means comprises a support body supportingly connected as a part of the assembly, and a support means for supporting connection to the motorcycle, the support body and the support means being fixedly connectable, in which the holding means comprises a first support component fixedly connected to the support body, and a second support component fixedly connected to the assembly, in a combination in which the first support component and the second support component are relatively rotatable, and by relatively rotatable motion they are engageable and disengageable to the collapsed and extended condition respectively.

3. A foot-rest device for a motorcycle in which two riders may sit one behind the other, one rider being the driver and one rider being the passenger, the motorcycle being provided with a forward seat for the support of the driver and having a rearward seat which supports the passenger behind the driver and in a location fore-and-aft of the motorcycle such that the feet of the passenger while seated on the passenger seat are positioned adjacent exhaust tubing or other features of the motorcycle, the foot-rest device comprising a telescoping support assembly of parts along an axis, the telescoping nature thereof providing that it has a variable overall length between an extended condition and a collapsed condition, and means for connecting the assembly to a portion of the motorcycle in which the axis of the assembly is generally perpendicular to the fore-and-aft axis of the motorcycle, the assembly's variability in length being:

(a) such that in its extended condition it projects substantially away from the motorcycle, away from the said exhaust tubing or other features, for ease of accommodation placement of the passenger's foot by placement of the passenger's foot along the foot-rest device of the motorcycle, (b) and such that in its collapsed condition it wholly lies closely adjacent the motorcycle, in which the assembly also comprises releasable holding means which optionally hold the assembly in its extended condition and its collapsed condition, in which the assembly comprises at least two support body sections, and in which the holding means which hold the assembly in its extended condition comprise inter-engaging abutments carried by two sections of the assembly, with a spring means biasing the two sections into engagement of their abutment means, and the holding means which hold the assembly in its collapsed condition include relatively rotatable means, one of which rotatable means is carried by a relatively outer section of the assembly, and another of which rotatable means is carried by a relatively, inner section of the assembly, in which the relatively rotatable means are screwthread means.

4. A foot-rest device for a motorcycle in which two riders may sit one behind the other, one rider being the driver and one rider being the passenger, the motorcycle being provided with a forward seat for the support of the driver and having a rearward seat which supports the passenger behind the driver and in a location fore-and-aft of the motorcycle such that the feet of the passenger while seated on the passenger seat are positioned adjacent exhaust tubing or other features of the motorcycle, the foot-rest device comprising a telescoping support assembly of parts along an axis, the telescoping nature thereof providing that it has a variable overall length between an extended condition and a collapsed condition, and means for connecting the assembly to a portion of the motorcycle in which the axis of the assembly is generally perpendicular to the fore-and-aft axis of the motorcycle, the assembly's variability in length being:

(a) such that in its extended condition it projects substantially away from the motorcycle, away from the said exhaust tubing or other features, for ease of accommodation placement of the passenger's foot by placement of the passenger's foot along the foot-rest device of the motorcycle, (b) and such that in its collapsed condition it wholly lies closely adjacent the motorcycle, in which the assembly also comprises releasable holding means which optionally hold the assembly in its extended condition and its collapsed condition, in which the assembly comprises at least two support body sections, and in which the holding means which hold the assembly in its extended condition comprise inter-engaging abutments carried by two sections of the assembly, with a spring means biasing the two sections into engagement of their abutment means, and the holding means which hold the assembly in its collapsed condition include relatively rotatable means, one of which rotatable means is carried by a relatively outer section of the assembly, and another of which rotatable means is carried by a relatively inner section of the assembly, in a combination in which there are provided intermediate support body section means, the intermediate support body section means also including abutments operatively engageable by abutment means carried by the inner and outer section, the intermediate support body section means providing a significantly longer length of the assembly when in the extended condition than when in the collapsed condition, substantially more length than is provided by the inner section and outer section themselves.

5. A foot-rest device as set forth in claim 3, in a combination in which there are male and female threaded components respectively carried by the inner section and the outer section.

* * * * *